United States Patent
Yoshida et al.

(10) Patent No.: US 12,483,177 B2
(45) Date of Patent: Nov. 25, 2025

(54) CONTROL DEVICE, ELECTRONIC APPARATUS, AND CONTROL METHOD

(71) Applicant: Mitsubishi Electric Corporation, Tokyo (JP)

(72) Inventors: Yuki Yoshida, Tokyo (JP); Michio Otsubo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 156 days.

(21) Appl. No.: 18/561,479

(22) PCT Filed: Jul. 15, 2021

(86) PCT No.: PCT/JP2021/026590
§ 371 (c)(1),
(2) Date: Nov. 16, 2023

(87) PCT Pub. No.: WO2023/286233
PCT Pub. Date: Jan. 19, 2023

(65) Prior Publication Data
US 2024/0258946 A1 Aug. 1, 2024

(51) Int. Cl.
*H02M 7/533* (2006.01)
*H02P 27/06* (2006.01)

(52) U.S. Cl.
CPC .................................. *H02P 27/06* (2013.01)

(58) Field of Classification Search
CPC ......... H02P 27/06; H02P 29/0241; H02P 3/22
See application file for complete search history.

(56) References Cited

U.S. PATENT DOCUMENTS 11,811,299 B2 * 11/2023 Fujimoto ............ H02M 1/0058
2016/0315479 A1 * 10/2016 Ide ........................ H02M 3/158

FOREIGN PATENT DOCUMENTS

JP      2007282379 A    10/2007

OTHER PUBLICATIONS

International Search Report (PCT/ISA/210) with translation and Written Opinion mailed on Aug. 31, 2021, by the Japanese Patent Office as the International Searching Authority for International Application No. PCT/JP2021/026590. (9 pages).

* cited by examiner

*Primary Examiner* — Muhammad S Islam
(74) *Attorney, Agent, or Firm* — BUCHANAN, INGERSOLL & ROONEY PC

(57) ABSTRACT

A control device controls a switching element that is connected to a conductor and that executes a switching operation for causing the conductor to switch between conductive and non-conductive states. The control device includes an element controller and a current value measurer. When a target conduction ratio is a positive value lower than 1, the element controller controls the switching element to be in an on-state during a period defined by a switching cycle and a detective conduction ratio than the target conduction ratio and equal to or lower than 1, in at least one cycle that is each the switching cycle. The current value measurer measures a value of direct current flowing in the conductor, based on a detected current value that is digital data generated in every sampling cycle independent from the switching cycle by detection of a current sensor signal output from a current sensor.

20 Claims, 11 Drawing Sheets

CONTROL DEVICE, ELECTRONIC APPARATUS, AND CONTROL METHOD

TECHNICAL FIELD

The present disclosure relates to a control device, an electronic apparatus, and a control method.

BACKGROUND ART

Some electronic apparatuses provided with a capacitor to be charged with DC power include a power consumption circuit that discharges the capacitor to avoid overvoltage of the capacitor, and a controller that controls the power consumption circuit. A typical example of the electronic apparatuses of this type is disclosed in Patent Literature 1.

The electric vehicle driving apparatus disclosed in Patent Literature 1 as an exemplary electronic apparatus includes a power consumption circuit made of a switching element and a resistor connected in series to each other. The electric vehicle driving apparatus also includes an electric vehicle control device. The electric vehicle control device controls the switching element so as to be in an on-state, and thus electrically connects the capacitor to the resistor and discharges the capacitor. The electric vehicle control device controls the switching element so as to be in the on-state during a period defined by the length of the switching cycle and a conduction ratio associated with the value of voltage applied to the capacitor. The value of voltage applied to the capacitor is thus maintained within a target voltage range.

CITATION LIST

Patent Literature

Patent Literature 1: Unexamined Japanese Patent Application Publication No. 2007-282379

SUMMARY OF INVENTION

Technical Problem

Some of the above-mentioned electronic apparatuses include a controller having a function of measuring a value of current flowing in a conductor that electrically connects a switching element to a resistor, in order to estimate an amount of power consumption in the resistor and a temperature of the resistor, for example. The conductor is provided with a current sensor. The current sensor measures a value of direct current flowing in the conductor and outputs a sensor signal that is analog data. The controller measures a value of current flowing in the conductor, based on digital data that is generated in every sampling cycle by detection of the value of the sensor signal output from the current sensor. In the case of a low conduction ratio of the switching element, however, on-state periods of the switching element may fail to include a timing of detection in each sampling timing. In this case, the controller cannot achieve accurate measurement of a value of current flowing in the conductor.

The present disclosure is made in view of the aforementioned circumstances, and an objective of the present disclosure is to provide a control device, an electronic apparatus, and a control method that can achieve highly accurate measurement of a value of current flowing in the conductor.

Solution to Problem

In order to achieve the above objective, a control device according to the present disclosure controls a switching element that is connected to a conductor and that executes a switching operation for causing the conductor to switch between a conductive state and a non-conductive state. The control device includes an element controller and a current value measurer. When a target conduction ratio indicating a target value of a conduction ratio indicating a ratio of a length of a period during which the switching element is in an on-state to a length of a switching cycle is a positive value lower than 1, the element controller controls the switching element so as to be in the on-state during a period defined by a detective conduction ratio and the length of the switching cycle in each of at least one cycle that is each the switching cycle. The detective conduction ratio is a value higher than the target conduction ratio and equal to or lower than 1. The current value measurer measures a value of direct current flowing in the conductor, based on a detected current value that is digital data generated in every sampling cycle independent from the switching cycle by detection of a value of a current sensor signal. The current sensor signal is analog data output from a current sensor configured to measure a value of direct current flowing in the conductor.

Advantageous Effects of Invention

When the target conduction ratio is a positive value lower than 1, the control device according to the present disclosure controls the switching element so as to be in the on-state during the period defined by (i) the detective conduction ratio that is a value higher than the target conduction ratio and equal to or lower than 1 (ii) and the length of the switching cycle, in at least one cycle that is each the switching cycle. This configuration can elongate the period during which the switching element is in the on-state and increase the probability of successful detection of a value of the current sensor signal at a timing included in the period during which the switching element is in the on-state, thus achieving accurate measurement of a value of direct current flowing in the conductor.

DESCRIPTION OF EMBODIMENTS

Figure 1:
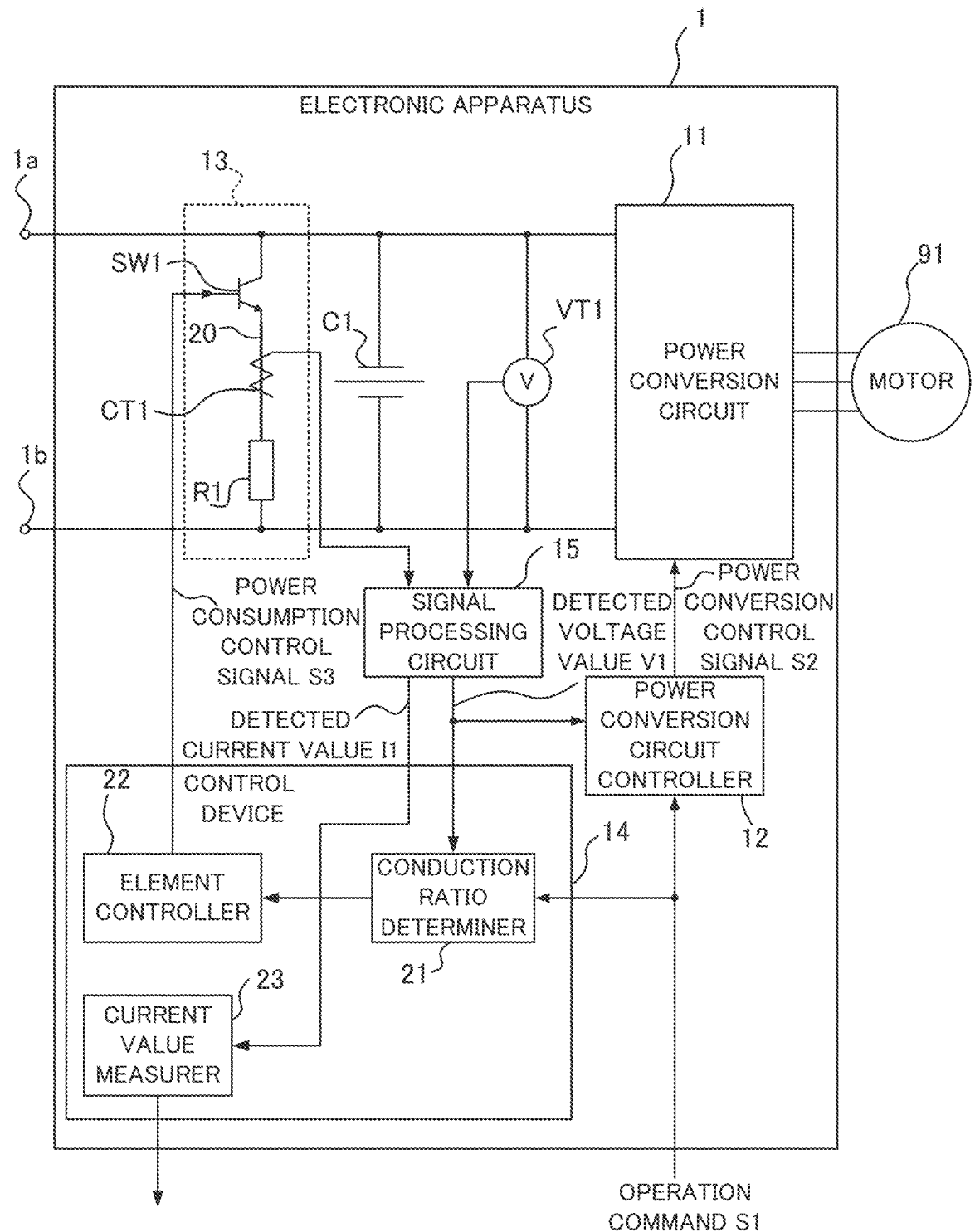
FIG. 1 is a block diagram illustrating a configuration of a power conversion apparatus according to an embodiment.

A control device, an electronic apparatus, and a control method according to an embodiment of the present disclosure are described in detail below with reference to the accompanying drawings. In the drawings, the components identical or corresponding to each other are provided with the same reference symbol.

A typical example of the electronic apparatus is a DC to three-phase AC converter installed in a railway vehicle to convert DC power fed from a power source into three-phase AC power and to feed the three-phase AC power to a load. Focusing on such a DC to three-phase AC converter installed in a railway vehicle, the following describes an electronic apparatus 1 according to an embodiment. The electronic apparatus 1 according to the embodiment, as illustrated in FIG. 1, is installed in a railway vehicle of a DC feeding system. The electronic apparatus 1 feeds three-phase AC power to a motor 91. The motor 91 is a three-phase induction motor driven by the fed three-phase AC power to generate a driving force of the railway vehicle. In detail, the motor 91 is driven to provide power to axles of the railway vehicle via components, such as joints and gears.

The electronic apparatus 1 has an input terminal 1a to be connected to the power source, and an input terminal 1b to be grounded. The electronic apparatus 1 further includes a power conversion circuit 11 to convert DC power fed from the power source into three-phase AC power and feed the three-phase AC power to the motor 91, or to convert three-phase AC power fed from the motor 91 serving as an electric generator into DC power and output the DC power, and a power conversion circuit controller 12 to control the power conversion circuit 11.

The electronic apparatus 1 also includes a capacitor C1 connected between a pair of primary terminals leading to the respective input terminals 1a and 1b of the power conversion circuit 11, a power consumption circuit 13 to consume electric power fed from the capacitor C1, and a control device 14 to control the power consumption circuit 13. The electronic apparatus 1 further includes a voltage sensor VT1 connected in parallel to the capacitor C1 to measure a value of voltage applied to the capacitor C1, a current sensor CT1 to measure a value of current flowing in the power consumption circuit 13, and a signal processing circuit 15 to convert the values measured by the voltage sensor VT1 and the current sensor CT1 into digital data.

The input terminal 1a is electrically connected via components, such as a non-illustrated contactor and a non-illustrated reactor to the power source, in specific, a current collector that acquires electric power fed from a substation via a power supply line. Examples of the current collector include a pantograph to acquire electric power via an overhead wire that is an example of the power supply line, and a contact shoe to acquire electric power via a third rail that is an example of the power supply line. The input terminal 1b is grounded via components, such as a non-illustrated ground ring, a non-illustrated ground brush, and a non-illustrated wheel.

The power conversion circuit 11 includes an inverter characterized by variable effective voltage and variable frequency of output AC power, for example. The power conversion circuit 11 includes multiple switching elements that each execute a switching operation under the control of the power conversion circuit controller 12. Each of the switching elements is made of an insulated gate bipolar transistor (IGBT), for example.

The power conversion circuit controller 12 acquires an operation command S1 from a non-illustrated cab. The operation command S1 indicates a command generated in accordance with a manipulation of an operator on a master controller installed in the cab. In specific, the operation command S1 indicates any of a power running command, a braking command, and a coasting command. The power conversion circuit controller 12 generates power conversion control signals S2 for controlling the individual switching elements of the power conversion circuit 11 in accordance with the operation command S1, and outputs the power conversion control signals S2. The power conversion control signals S2 are each a pulse width modulation (PWM) signal, for example.

The capacitor C1 has one end connected to the connecting point between the input terminal 1a and one of the primary terminals of the power conversion circuit 11. The capacitor C1 has the other end connected to the connecting point between the input terminal 1b and the other primary terminal of the power conversion circuit 11. The capacitor C1 is charged with DC power fed from the power source or DC power output from the power conversion circuit 11.

The voltage sensor VT1 is connected in parallel to the capacitor C1. The voltage sensor VT1 is made of a voltage transformer (VT), for example. The voltage sensor VT1 measures a value of voltage applied to the capacitor C1, and outputs a voltage sensor signal indicating the measured value that is analog data.

The power consumption circuit 13 is connected in parallel to the capacitor C1. The power consumption circuit 13 includes a switching element SW1 and the resistor R1 connected in series to each other. The switching element SW1 is made of an IGBT, for example. The switching element SW1 executes switching operations for a conductor electrically connected to the switching element SW1. For example, the switching element SW1 causes a conductor 20 that electrically connects the emitter terminal of the switching element SW1 to the resistor R1 to switch between the conductive state and the non-conductive state. In specific, switching the switching element SW1 to an on-state brings the conductor 20 into the conductive state, and switching the switching element SW1 to an off-state brings the conductor 20 into the non-conductive state.

Switching the switching element SW1 to the on-state by the above switching operation, electrically connects the capacitor C1 to the resistor R1, and this switching operation allows electric power fed from the capacitor C1 to be consumed by the resistor R1. The power consumption causes discharge of the capacitor C1 and a reduction in the value of voltage applied to the capacitor C1. Switching the switching element SW1 to the off-state electrically disconnects the capacitor C1 from the resistor R1.

The current sensor CT1 provided in the power consumption circuit 13 includes a current transformer (CT) to be provided to the conductor 20 that is a bus bar configured to electrically connect the switching element SW1 to the resistor R1, for example. The current sensor CT1 measures a value of current flowing in the conductor 20 and outputs a current sensor signal indicating the measured value that is analog data.

The signal processing circuit 15 samples values of the voltage sensor signal output from the voltage sensor VT1 and the current sensor signal output from the current sensor CT1 in every sampling cycle, and outputs digital data indicating the detected values. In detail, the signal processing circuit 15 detects a measured value indicated by the voltage sensor signal output from the voltage sensor VT1 in every sampling cycle, generates a detected voltage value V1 that is digital data indicating a value of voltage applied to the capacitor C1, and outputs the detected voltage value V1 to the power conversion circuit controller 12 and the control device 14. The signal processing circuit 15 detects a measured value indicated by the current sensor signal output from the current sensor CT1 in every sampling cycle, generates a detected current value I1 that is digital data indicating a value of direct current flowing in the conductor 20, and outputs the detected current value I1 to the control device 14.

The control device 14 includes a conduction ratio determiner 21 to determine a target conduction ratio indicating a target value of the conduction ratio of the switching element SW1, an element controller 22 to generate a power consumption control signal S3 for controlling the switching element SW1 so as to be in the on-state during an on-state period defined by the target conduction ratio and a length of a switching cycle, and a current value measurer 23 to measure a value of current flowing in the conductor 20 on the basis of the detected current value I1.

The following describes the components of the control device 14.

The conduction ratio determiner 21 acquires an operation command S1 from the cab. In response to the operation command S1 containing a braking command, the conduction ratio determiner 21 determines a target conduction ratio in accordance with the value of voltage applied to the capacitor C1, and outputs the target conduction ratio. The conduction ratio of the switching element SW1 is a value of 0 or higher and 1 or lower, and indicates a ratio of the length of a period during which the switching element SW1 is in the on-state to the length of each switching cycle of the switching element SW1.

The element controller 22 acquires the target conduction ratio from the conduction ratio determiner 21, and controls the switching element SW1 so as to be in the on-state during an on-state period defined by the target conduction ratio and the length of the switching cycle. In specific, the element controller 22 refers to a reference signal output from a non-illustrated oscillator, and generates a power consumption control signal S3 that is a PWM signal for indicating the on-state during the on-state period defined by the target conduction ratio and the length of the switching cycle in each switching cycle defined by the cycle of the reference signal. The on-state period is a value calculated by multiplying the length of the switching cycle by the target conduction ratio. The element controller 22 then outputs the power consumption control signal S3 to the switching element SW1.

When the target conduction ratio is a positive value lower than 1, the element controller 22 generates a power consumption control signal S3 for indicating the on-state during an on-state period defined by a detective conduction ratio and the length of the switching cycle in at least one switching cycle. The detective conduction ratio is a value higher than the target conduction ratio and equal to or lower than 1. The detective conduction ratio used in the element controller 22 is, for example, a lower one of the value of 1 and the value calculated by multiplying the target conduction ratio by a coefficient of 1 or larger.

The current value measurer 23 measures a value of current flowing in the conductor 20 on the basis of the detected current value I1. In detail, the current value measurer 23 calculates the product of the detected current value I1 and the turns ratio of the CT of the current sensor CT1, and regards this product as the measured value of current flowing in the conductor 20. The current value measurer 23 then transmits the measured value of current flowing in the conductor 20 to a monitoring system, such as a train information management system, for monitoring whether the value of current flowing in the conductor 20 indicates an overcurrent, for example.

Figure 2:
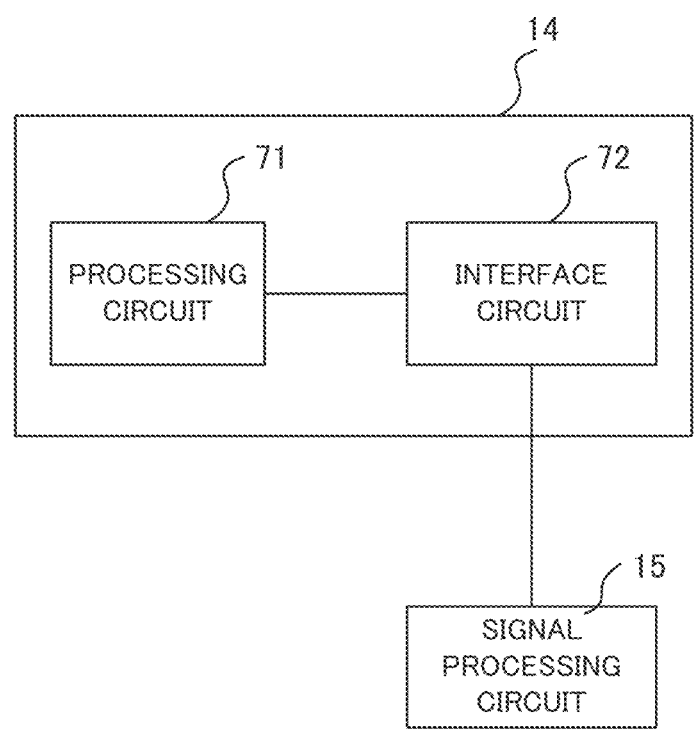
FIG. 2 is a block diagram illustrating a hardware configuration of the power conversion apparatus according to the embodiment.

As illustrated in FIG. 2, the control device 14 having the above-described configuration is achieved by a processing circuit 71. The processing circuit 71 is connected via an interface circuit 72 to the signal processing circuit 15, and components, such as the cab and the switching element SW1 of the power consumption circuit 13 that are not illustrated in FIG. 2. In the case where the processing circuit 71 is dedicated hardware, the processing circuit 71 is a single circuit, a combined circuit, a processor, an application specific integrated circuit (ASIC), a field programmable gate array (FPGA), or a combination thereof, for example. The components of the control device 14 may be achieved by separate processing circuits 71. Alternatively, the components of the control device 14 may be achieved by a common processing circuit 71.

The electronic apparatus 1 having the above-described configuration executes operations described below.

In response to an operation command S1 containing a power running command, the electronic apparatus 1 illustrated in FIG. 1 converts DC power fed via the input terminals 1a and 1b into three-phase AC power and feeds the three-phase AC power to the motor 91. The motor 91 is driven by the fed three-phase AC power to generate the driving force of the railway vehicle.

In detail, in response to the operation command S1 containing a power running command, the power conversion circuit controller 12 acquires values of phase current flowing in the motor 91 measured by a non-illustrated current sensor, and determines a target torque that is a target value of torque of the motor 91, in accordance with the target value of acceleration of the railway vehicle indicated by the power running command and the values of phase current. The power conversion circuit controller 12 then determines a designated voltage value indicating a target value of voltage to be output from the power conversion circuit 11 that can achieve the target torque. The power conversion circuit controller 12 then generates power conversion control signals S2 for controlling switching operations of the individual switching elements of the power conversion circuit 11 in accordance with the designated voltage value, and outputs the power conversion control signals S2.

The power conversion control signals S2 are fed to the gate signal of the individual switching elements of the power conversion circuit 11, and thus causes the switching elements to execute switching operations. The switching operations allow the power conversion circuit 11 to convert DC power into three-phase AC power and feed the three-phase AC power to the motor 91.

In response to an operation command S1 containing a braking command, the motor 91 serving as an electric generator feeds three-phase AC power to the electronic apparatus 1. The electronic apparatus 1 converts the three-phase AC power fed from the motor 91 into DC power, and feeds the DC power to other railway vehicles running in the vicinity of the original railway vehicle provided with the electronic apparatus 1 via the current collector and the power supply line. The three-phase AC power generated by the motor 91 is fed to and consumed by other railway vehicles, resulting in a regenerative braking force for decelerating the original railway vehicle.

In detail, in response to the operation command S1 containing a braking command, the power conversion circuit controller 12 acquires the detected voltage value V1 from the signal processing circuit 15, and acquires the values of phase current flowing from the motor 91 to the power conversion circuit 11 measured by the non-illustrated current sensor. The power conversion circuit controller 12 then determines a designated voltage value indicating a target value of voltage to be output from the power conversion circuit 11, in accordance with the detected voltage value V1 and the values of phase current flowing from the motor 91 to the power conversion circuit 11.

The target value of voltage to be output from the power conversion circuit 11 falls within a target voltage range higher than the overhead wire voltage and allows for a regenerative brake, for example. The power conversion circuit controller 12 generates power conversion control signals S2 for controlling switching operations of the individual switching elements of the power conversion circuit 11 in accordance with the designated voltage value, and outputs the power conversion control signals S2.

The power conversion control signals S2 are fed to the gate signal of the individual switching elements of the power conversion circuit 11, and thus causes the switching elements to execute switching operations. The switching operations allow the power conversion circuit 11 to convert three-phase AC power fed from the motor 91 into DC power and charge the capacitor C1 with the DC power.

When any other railway vehicle during acceleration is running in the vicinity of the original railway vehicle provided with the electronic apparatus 1, the electric power generated by the motor 91 is fed to and consumed by the other railway vehicle, resulting in a regenerative braking force for decelerating the original railway vehicle, as described above.

In contrast, when no other railway vehicle during acceleration is running in the vicinity of the original railway vehicle provided with the electronic apparatus 1, the electric power generated by the motor 91 is not consumed, resulting in no regenerative braking force. No consumption of the electric power generated by the motor 91 leads to an increase in the voltage value of the capacitor C1. Thus, the control device 14 causes the power consumption circuit 13 to consume the electric power fed from the motor 91 via the capacitor C1. This process yields a dynamic braking force. During consumption of the electric power at the power consumption circuit 13, the control device 14 measures a value of current flowing in the conductor 20. This process executed by the control device 14 is described below with reference to FIG. 3.

Figure 3:
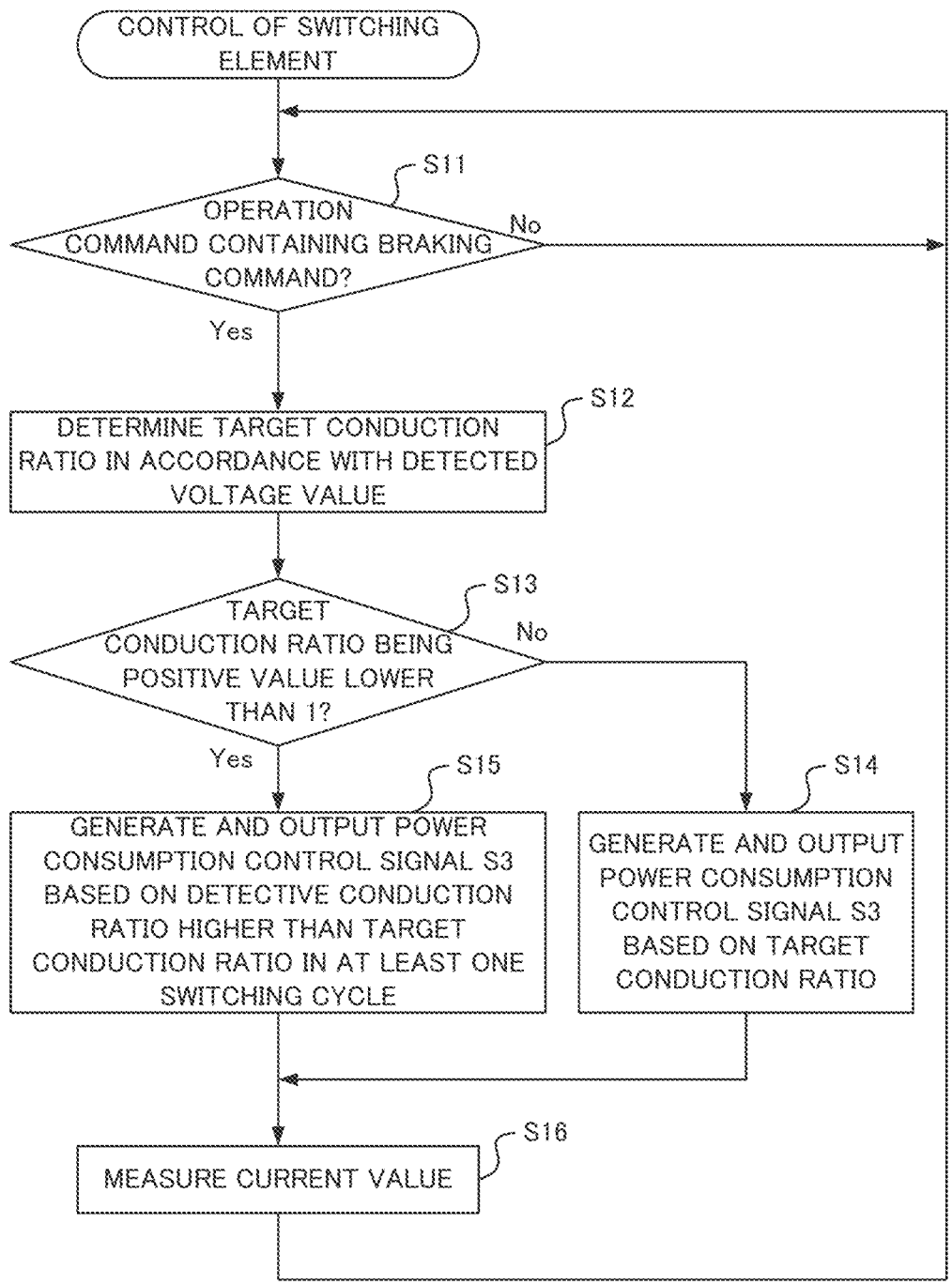
FIG. 3 is a flowchart illustrating an exemplary process of controlling a switching element executed by a control device according to the embodiment.

The control device 14, upon receiving an operation command S1, initiates the process illustrated in FIG. 3. In response to an operation command S1 containing no braking command (Step S11; No), the control device 14 repeats Step S11. In contrast, in response to an operation command S1 containing a braking command (Step S11; Yes), the conduction ratio determiner 21 determines a target conduction ratio indicating a target value of the conduction ratio of the switching element SW1 in accordance with the detected voltage value V1 (Step S12).

Figure 4:
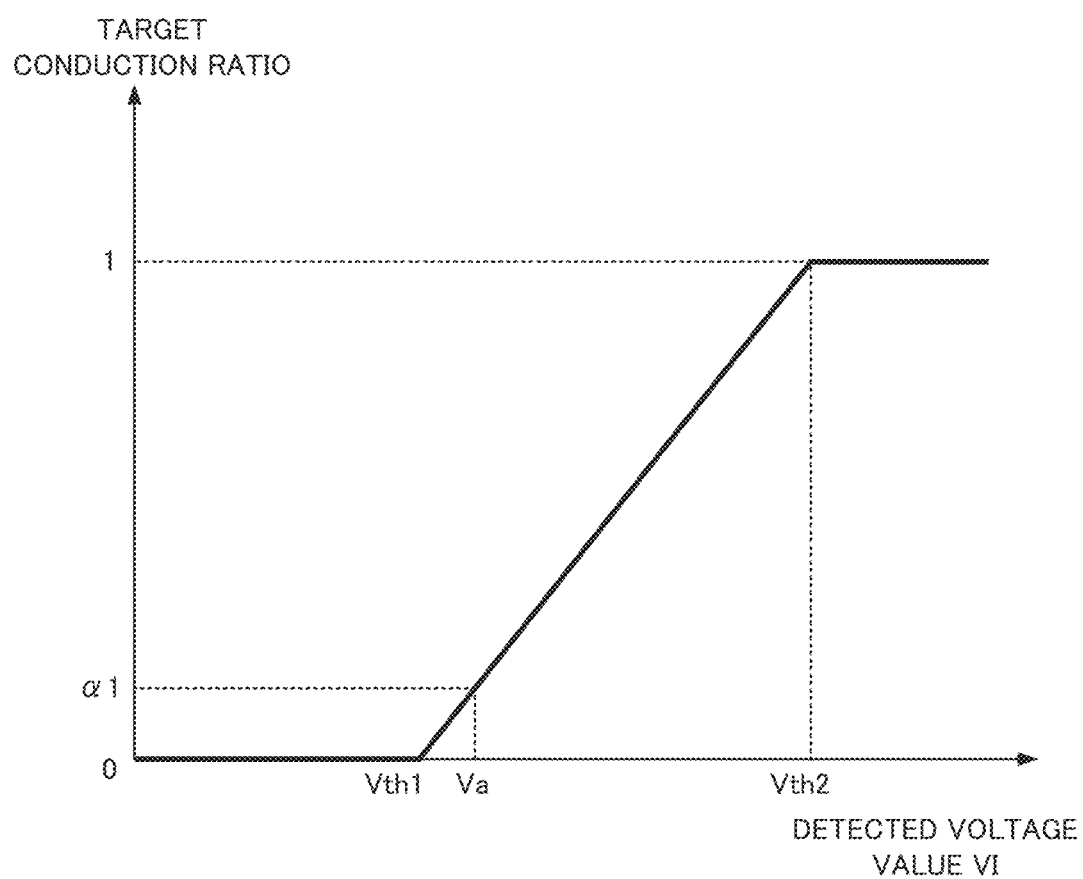
FIG. 4 illustrates a relationship between a detected voltage value and a target conduction ratio in the embodiment.

In detail, the conduction ratio determiner 21 determines a target conduction ratio, on the basis of a predetermined relationship between the detected voltage value V1 and the target conduction ratio, for example, as illustrated in FIG. 4. For example, when the detected voltage value V1 is equal to or lower than a threshold voltage value Vth1, the conduction ratio determiner 21 sets the target conduction ratio to 0. When the detected voltage value V1 is higher than the threshold voltage value Vth1 and lower than a voltage value Vth2, the conduction ratio determiner 21 determines a target conduction ratio that linearly increases with the detected voltage value V1 in positive correlation with the detected voltage value V1. The threshold voltage value Vth1 is a voltage value of the capacitor C1 when the capacitor C1 needs to be discharged. In an exemplary case of the detected voltage value V1=Va, the conduction ratio determiner 21 sets the target conduction ratio to α1. When the detected voltage value V1 is equal to or higher than the voltage value Vth2, the conduction ratio determiner 21 sets the target conduction ratio to 1. The conduction ratio determiner 21 then outputs the target conduction ratio determined as described above to the element controller 22.

When the target conduction ratio is not a positive value lower than 1, in other words, the target conduction ratio is 0 or 1 (Step S13 in FIG. 3; No), the element controller 22 generates a power consumption control signal S3 based on the target conduction ratio determined in Step S12, and outputs the power consumption control signal S3 (Step S14). In detail, the element controller 22 outputs the power consumption control signal S3 for indicating the on-state during on-state periods defined by the target conduction ratio and the length of the switching cycle. The switching element SW1 is accordingly in the on-state during an on-state period defined by the target conduction ratio and the length of the switching cycle in each switching cycle.

When the target conduction ratio is a positive value lower than 1 (Step S13; Yes), the element controller 22 generates a power consumption control signal S3 based on the detective conduction ratio that is a value higher than the target conduction ratio and equal to or lower than 1, in at least one switching cycle, and outputs the power consumption control signal S3 (Step S15). In detail, the element controller 22 outputs the power consumption control signal S3 for indicating the on-state during an on-state period defined by the detective conduction ratio and the length of the switching cycle in at least one switching cycle. The switching element SW1 is accordingly in the on-state during the on-state period defined by the detective conduction ratio and the length of the switching cycle in at least one switching cycle. In other words, the on-state period of the switching element SW1 in at least one switching cycle is longer than the above-mentioned on-state period defined by the target conduction ratio and the length of the switching cycle.

After Steps S14 and S15, the current value measurer 23 measures a value of current flowing in the conductor 20 on the basis of the detected current value I1 (Step S16). Step S11 and the following steps are then repeated.

Steps S13 to S16 are described in more detail below with reference to FIG. 5. T1 indicates the time when the detected voltage value V1 reaches a voltage Va higher than the threshold voltage value Vth1. The following description assumes an example in which a measurement period for measurement of the value of current flowing in the conductor 20 starts at the time T1 and ends at the time T2. Although not illustrated, this measurement period is repeatedly started and ended after the time T2. The measurement period is assumed to encompass some switching cycles. The conduction ratio in the case of the detected voltage value V1=Va is defined as $\alpha 1$, as illustrated in FIG. 4. At the time T1 illustrated in FIG. 5, the conduction ratio determiner 21 sets the target conduction ratio to $\alpha 1$.

Figure 5:
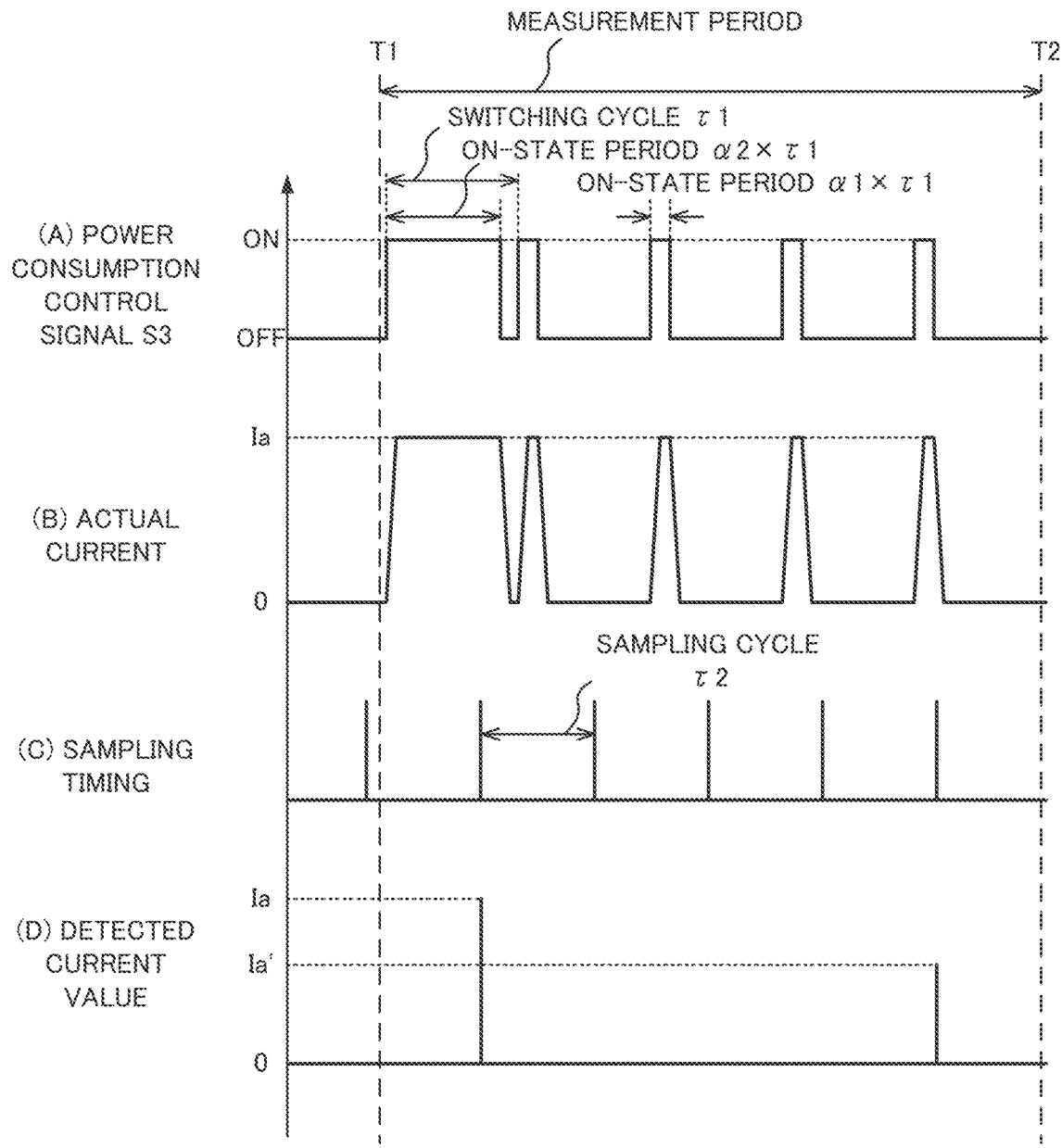
FIG. 5 is a timing chart illustrating an operation of the control device according to the embodiment: the part (A) illustrates a power consumption control signal, the part (B) illustrates an actual current flowing in a conductor, the part (C) illustrates sampling timings, and the part (D) illustrates a detected current value.

As illustrated in the part (A) of FIG. 5, the element controller 22 generates a power consumption control signal S3 for indicating the on-state during the period associated with a detective conduction ratio $\alpha 2$ higher than the target conduction ratio $\alpha 1$ in the first switching cycle in the measurement period and for indicating the on-state during the period associated with the target conduction ratio $\alpha 1$ in each of the following switching cycles. In specific, assuming that $\tau 1$ indicates the length of a switching cycle, the on-state period indicated by the power consumption control signal S3 is a value of $\alpha 2 \times \tau 1$ calculated by multiplying the detective conduction ratio $\alpha 2$ by the switching cycle $\tau 1$, in the first switching cycle. The on-state period indicated by the power consumption control signal S3 is a value of $\alpha 1 \times \tau 1$ calculated by multiplying the target conduction ratio $\alpha 1$ by the switching cycle $\tau 1$, in each of the following switching cycles.

The switching element SW1, upon receiving a power consumption control signal S3 at the gate terminal, executes switching operations. In specific, the switching element SW1 is in the on-state when the power consumption control signal S3 indicates the on-state. Switching the switching element SW1 to the on-state electrically connects the resistor R1 to the capacitor C1, allowing a current to flow in the conductor 20 and the resistor R1. In contrast, the switching element SW1 is in the off-state when the power consumption control signal S3 indicates the off-state. Switching the switching element SW1 to the off-state electrically disconnects the resistor R1 from the capacitor C1, allowing no current to flow in the conductor 20 and the resistor R1.

The switching operations of the switching element SW1 in accordance with the power consumption control signal S3 illustrated in the part (A) of FIG. 5 allow a direct current to flow in the conductor 20 and the resistor R1, as illustrated in the part (B) of FIG. 5. The part (B) of FIG. 5 illustrates an example of actual current flowing in the conductor 20. Ia indicates a value of current flowing in the conductor 20 while the switching element SW1 is in the on-state, for example.

The measured value indicated by the current sensor signal is repetitively detected by the signal processing circuit 15 in every sampling cycle $\tau 2$. The sampling cycle $\tau 2$ is determined on the basis of a clock independent from the switching cycles. As illustrated in the part (C) of FIG. 5, one of the sampling timings of detection in the sampling cycles t2 is included in the period during which the switching element SW1 is in the on-state, having a length $\alpha 2 \times \tau 1$ calculated by multiplying the detective conduction ratio $\alpha 2$ by the switching cycle $\tau 1$, in the first switching cycle encompassed in the measurement period.

The signal processing circuit 15 thus outputs a current Ia as the detected current value I1 that is a detected value of current flowing in the conductor 20, as illustrated in the part (D) of FIG. 5.

Switching the switching element SW1 to the off-state leads to a gradual decrease in the value of current flowing in the conductor 20. The value of current flowing in the conductor 20 during such a gradual decrease is detected at the six sampling timing illustrated in the part (C) of FIG. 5, although the sixth sampling timing is not included in any of the on-state periods illustrated in the part (A) of FIG. 5. In detail, at the sixth sampling timing illustrated in the part (C) of FIG. 5, the signal processing circuit 15 outputs a current Ia' lower than the current Ia, as the detected current value I1 that is a detected value of current flowing in the conductor 20, as illustrated in the part (D) of FIG. 5.

The current value measurer 23 measures a value of current flowing in the conductor 20, on the basis of the maximum value of the detected current values I1 within the measurement period. As illustrated in the part (D) of FIG. 5, the maximum value of the detected current values I1 is the current Ia. The current value measurer 23 thus outputs the product of the current Ia and the turns ratio of the CT of the current sensor CT1, as the value of current flowing in the conductor 20. This measurement period and this process are repeated after the time T2, while the voltage of the capacitor C1, that is, the detected voltage value V1 is higher than threshold voltage value Vth1.

As described above, when the target conduction ratio is a positive value lower than 1, the control device according to the embodiment controls the switching element SW1 to be in the on-state during the on-state period defined by the detective conduction ratio that is a value higher than the target conduction ratio and equal to or lower than 1, and the length of the switching cycle, in at least one switching cycle. The on-state period of the switching element SW1 is thus longer than the on-state period defined by the target conduction ratio and the length of the switching cycle. This configuration can allow a current sensor signal output from the current sensor CT1 to be detected at a timing included in the on-state period of the switching element SW1, thereby achieving accurate measurement of a value of current flowing in the conductor 20.

Figure 6:
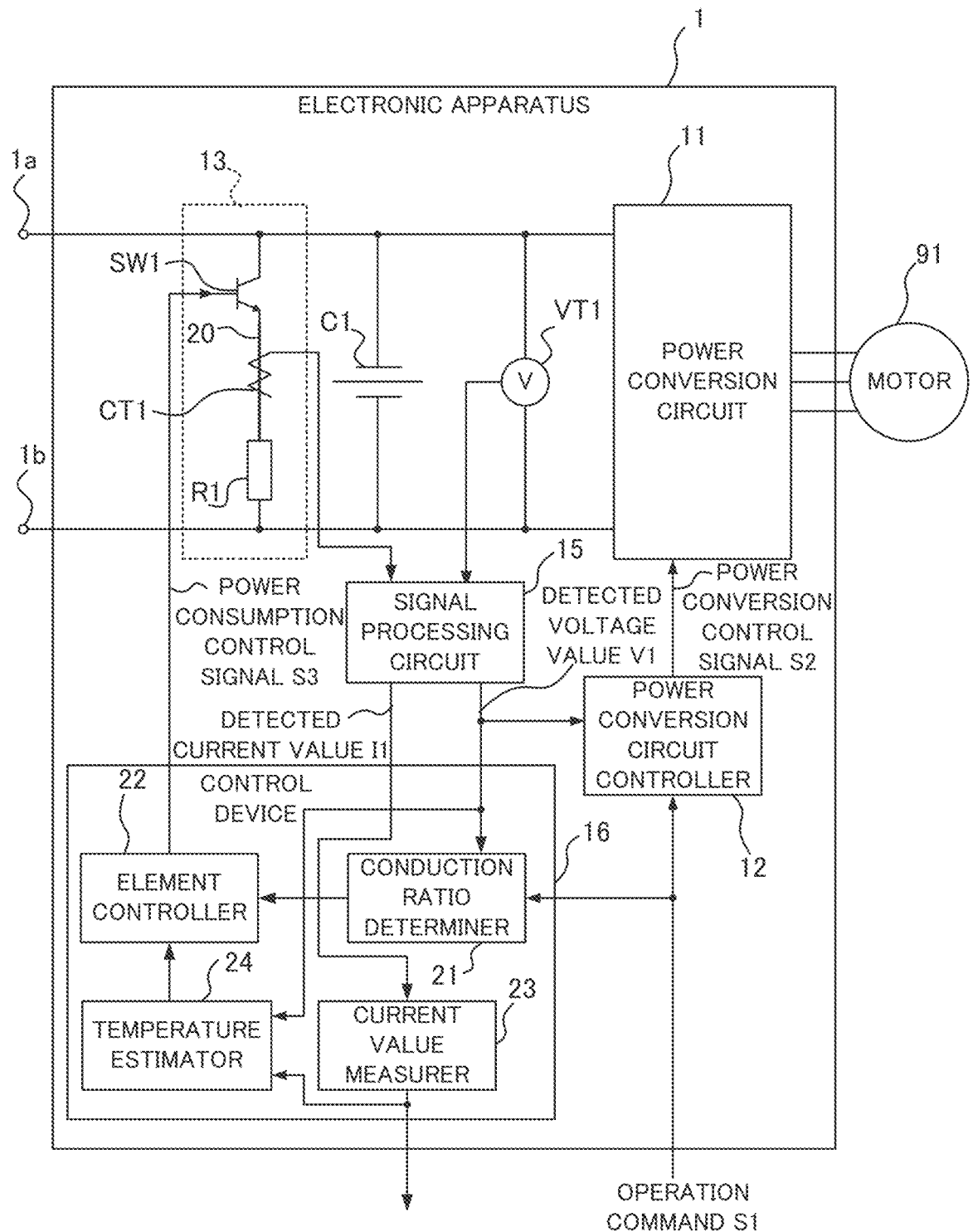
FIG. 6 is a block diagram illustrating a first modification of the configuration of the power conversion apparatus according to the embodiment.

The above-described embodiments are not to be construed as limiting the scope of the present disclosure. Although the control device 14 according to the embodiment transmits the measured value of current to an external monitoring system, the control device 14 may control the switching element SW1 in accordance with the measured value of current. In one exemplary modification, the electronic apparatus 1 illustrated in FIG. 6 includes a control device 16 to estimate a temperature of the resistor R1. The control device 16 further includes a temperature estimator 24 to estimate a temperature of the resistor R1 from the value of current measured by the current value measurer 23, in addition to the components of the control device 14. The control device 16 has the hardware configuration similar to that of the control device 14.

The temperature estimator 24 acquires the detected voltage value V1 from the signal processing circuit 15 and acquires the measured value of current from the current value measurer 23. In accordance with these acquired values, the temperature estimator 24 estimates a temperature of the resistor R1. The temperature estimator 24 provides the estimated temperature of the resistor R1 to the element controller 22.

In specific, the temperature estimator 24 estimates a temperature of the resistor R1 on the basis of Expression (1) below. Expression (1) below assumes that T1 indicates a temperature of the resistor R1, T0 indicates an initial temperature that is a temperature of the resistor R1 subject to no current flow, and ΔT indicates an increase in the temperature of the resistor R1 caused by a current flow. ΔT is represented in Expression (2) below. Expression (2) below assumes that k indicates a predetermined temperature coefficient, V1 indicates a detected voltage value, and Id indicates a value of current measured by the current value measurer 23. The temperature estimator 24 preliminarily retains information on the initial temperature T0 and the temperature coefficient k that indicates an increase in the temperature of the resistor R1 relative to an amount of power consumption and is defined by a predetermined temperature curve.

$$T1 = T0 + \Delta T \qquad (1)$$

$$\Delta T = k \times V1 \times Id \qquad (2)$$

The element controller 22, upon receiving the estimated temperature of the resistor R1 equal to or higher than a threshold temperature from the temperature estimator 24, controls the switching element SW1 using a conduction ratio lower than the target conduction ratio determined by the conduction ratio determiner 21. For example, upon receiving the estimated temperature of the resistor R1 equal to or higher than the threshold temperature from the temperature estimator 24, the element controller 22 generates a power consumption control signal S3 based on the target conduction ratio of 0, and outputs the power consumption control signal S3.

The threshold temperature is defined depending on the temperature range acceptable by the elements constituting the resistor R1. For example, the threshold temperature is calculated by multiplying the upper limit of temperatures acceptable by the elements constituting the resistor R1 by a value of 0.8. The above-described control of the switching element SW1 executed by the element controller 22 can avoid an excessive increase in the temperature of the resistor R1.

Figure 7:
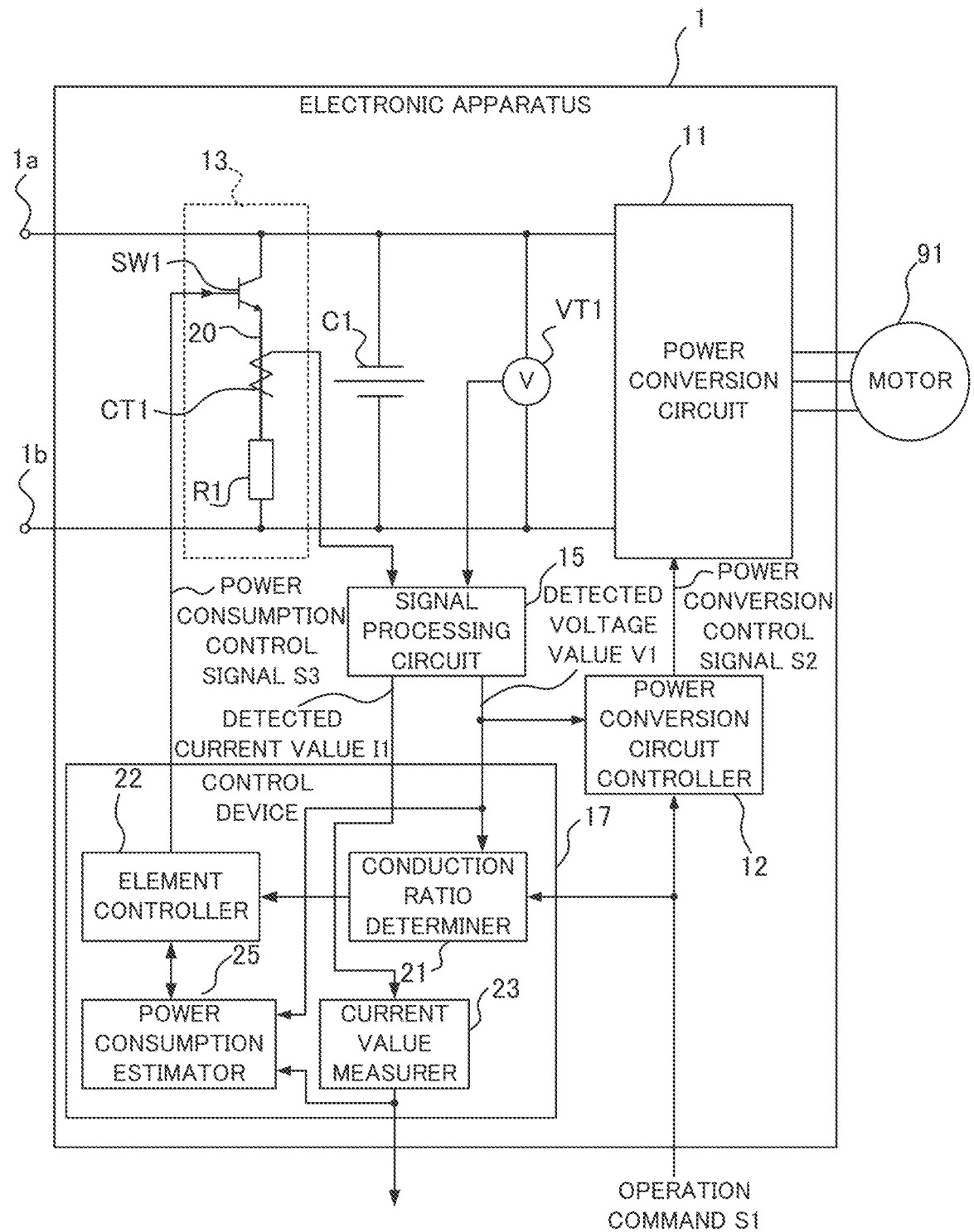
FIG. 7 is a block diagram illustrating a second modification of the configuration of the power conversion apparatus according to the embodiment.

In another exemplary modification, the electronic apparatus 1 illustrated in FIG. 7 includes a control device 17 to estimate an amount of power consumption in the resistor R1. The control device 17 further includes a power consumption estimator 25 to estimate an amount of power consumption in the resistor R1 from the value of current measured by the current value measurer 23, in addition to the components of the control device 14. The control device 17 has the hardware configuration similar to that of the control device 14.

The power consumption estimator 25 acquires the detected voltage value V1 from the signal processing circuit 15, acquires the measured value of current from the current value measurer 23, and acquires the total length of on-state periods of the switching element SW1 from the element controller 22. In accordance with these acquired values, the power consumption estimator 25 estimates an amount of power consumption in the resistor R1 during the measurement period. The power consumption estimator 25 then provides the estimated amount of power consumption to the element controller 22.

In specific, the power consumption estimator 25 calculates an amount of power consumption in the resistor R1 during the measurement period on the basis of Expression (3) below. Expression (3) below assumes that W1 indicates a power consumption in the resistor R1, V1 indicates a detected voltage value, Id indicates a value of current measured by the current value measurer 23, and t1 indicates the total length of on-state periods in the measurement period.

$$W1 = V1 \times Id \times t1 \qquad (3)$$

The element controller 22, upon receiving the amount of power consumption in the resistor R1 equal to or larger than a threshold power amount from the power consumption estimator 25, controls the switching element SW1 using a conduction ratio lower than the target conduction ratio determined by the conduction ratio determiner 21. For example, upon receiving the amount of power consumption in the resistor R1 equal to or larger than the threshold power amount from the power consumption estimator 25, the element controller 22 generates a power consumption control signal S3 for indicating the on-state during on-state periods defined by the target conduction ratio set to 0 and the length of the switching cycle, and outputs the power consumption control signal S3.

As represented in above Expression (2), the temperature of the resistor R1 rises in proportion to the product of the detected voltage value V1 and the value of current Id measured by the current value measurer 23. In other words, the temperature of the resistor R1 rises in proportion to the amount of power consumption. The threshold power amount is thus defined depending on the temperature range acceptable by the elements constituting the resistor R1. For example, the threshold power amount is calculated by dividing the increase in the temperature acceptable by the elements constituting the resistor R1 by the temperature coefficient k, and then multiplying the resultant by a value of 0.8. The above-described control of the switching element SW1 executed by the element controller 22 can avoid an excessive increase in the temperature of the resistor R1 due to an increase in the amount of power consumption in the resistor R1.

Although the power consumption estimator 25 estimates an amount of power consumption in the resistor R1 during the measurement period in the above exemplary modification, the power consumption estimator 25 may estimate an amount of power consumption in the resistor R1 during a period different from the measurement period. For example, the power consumption estimator 25 may estimate an amount of power consumption in the resistor R1 during an estimation period that encompasses the measurement period and that is designed for estimation of an amount of power consumption.

Figure 8:
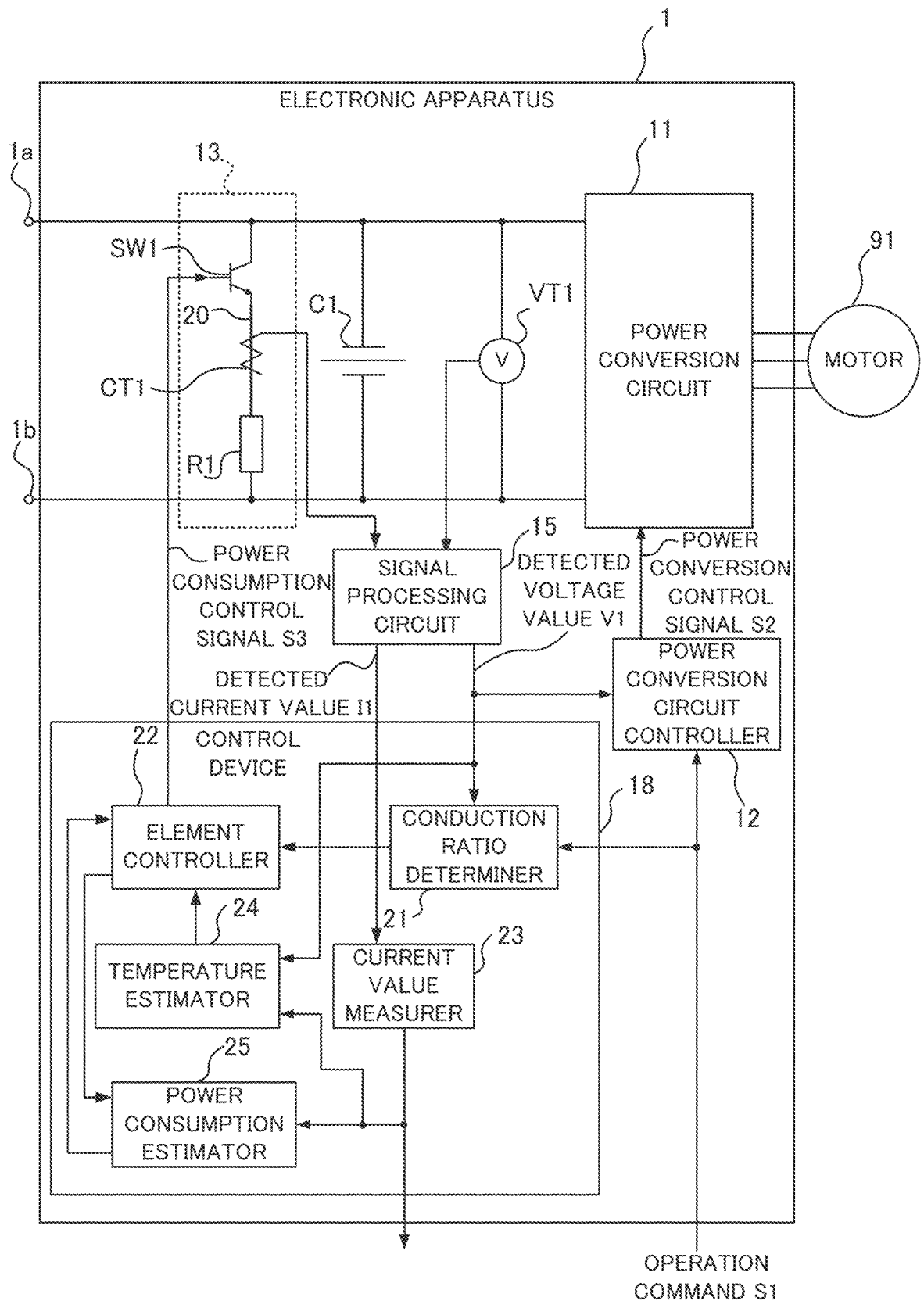
FIG. 8 is a block diagram illustrating a third modification of the configuration of the power conversion apparatus according to the embodiment.

In another exemplary modification, the electronic apparatus 1 illustrated in FIG. 8 includes a control device 18 to estimate a temperature of the resistor R1 and an amount of power consumption in the resistor R1. The control device 18 includes both of the temperature estimator 24 and the power consumption estimator 25 described above. The control device 18 has the hardware configuration similar to that of the control device 14. The element controller 22, upon receiving the estimated temperature of the resistor R1 equal to or higher than the threshold temperature from the temperature estimator 24, or upon receiving the amount of power consumption equal to or larger than the threshold power amount from the power consumption estimator 25, controls the switching element SW1 using a conduction ratio lower than the target conduction ratio determined by the conduction ratio determiner 21. In detail, upon receiving the estimated temperature of the resistor R1 equal to or higher than the threshold temperature, or upon receiving the estimated amount of power consumption equal to or higher than the threshold power amount, the element controller 22 generates a power consumption control signal S3 for indicating the on-state during on-state periods defined by a conduction ratio lower than the target conduction ratio and the length of the switching cycle, and outputs the power consumption control signal S3.

The conduction ratio determiner 21 may be independent from the control devices 14 and 16 to 18. In this case, the control devices 14 and 16 to 18 execute the above-described control using a target conduction ratio transmitted from the conduction ratio determiner 21.

Figure 9:
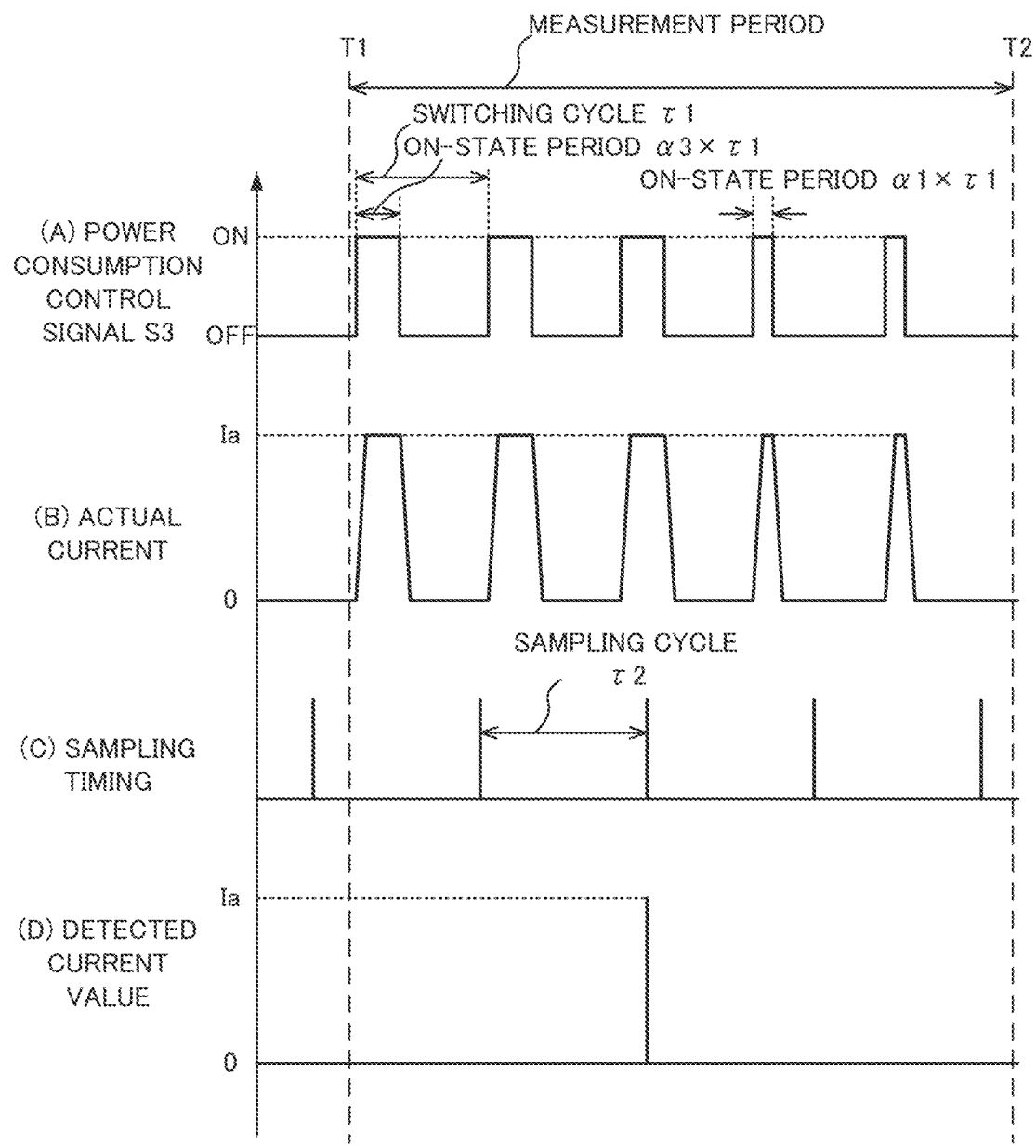
FIG. 9 is a timing chart illustrating a first modification of the operation of the control device according to the embodiment: the part (A) illustrates a power consumption control signal, the part (B) illustrates an actual current flowing in the conductor, the part (C) illustrates sampling timings, and the part (D) illustrates a detected current value.

The above-described adjustment of the conduction ratio of the switching element SW1 executed by the element controller 22 is a mere example. In one exemplary modification, as illustrated in FIG. 9, the element controller 22 may control the switching element SW1 using the detective conduction ratio, in each of successive switching cycles. FIG. 9 can be understood like FIG. 5.

As illustrated in the part (A) of FIG. 9, the element controller 22 generates a power consumption control signal S3 for indicating the on-state during the period defined by a detective conduction ratio $\alpha 3$ higher than the target conduction ratio $\alpha 1$ and the length of the switching cycle in each of successive switching cycles, in specific, three successive switching cycles encompassed in the measurement period, and for indicating the on-state during the period defined by the target conduction ratio $\alpha 1$ and the length of the switching cycle in each of the following switching cycles. For example, assuming that $\tau 1$ indicates the length of a switching cycle, the on-state period indicated by the power consumption control signal S3 is a value of $\alpha 3 \times \tau 1$ calculated by multiplying the detective conduction ratio $\alpha 3$ by the switching cycle $\tau 1$, in each of the three successive switching cycles. The on-state period indicated by the power consumption control signal S3 is a value of $\alpha 1 \times \tau 1$ calculated by multiplying the target conduction ratio $\alpha 1$ by the switching cycle 11, in each of the following switching cycles.

The switching element SW1, upon receiving a power consumption control signal S3 illustrated in the part (A) of FIG. 9 at the gate terminal, executes switching operations. These switching operations allow a direct current to flow in the conductor 20 and the resistor R1, as illustrated in the part (B) of FIG. 9. The part (B) of FIG. 9 illustrates an example of actual current flowing in the conductor 20. Ia indicates a value of current flowing in the conductor 20 while the switching element SW1 is in the on-state, for example.

As illustrated in the part (C) of FIG. 9, the sampling cycle 12 is determined on the basis of a clock independent from the switching cycles. One of the sampling timings of detection in the sampling cycles is included in the period during which the switching element SW1 is in the on-state, having a length of period of a value of $\alpha 3 \times \tau 1$ calculated by multiplying the detective conduction ratio $\alpha 3$ by the switching cycle $\tau 1$, in the third switching cycle among the switching cycles encompassed in the measurement period.

The signal processing circuit 15 thus outputs a current Ia as the detected current value I1 that is a detected value of current flowing in the conductor 20, as illustrated in the part (D) of FIG. 9.

The current value measurer 23 measures a value of current flowing in the conductor 20, on the basis of the maximum value of the detected current values I1 within the measurement period. As illustrated in the part (D) of FIG. 9, the maximum value of the detected current values I1 within the measurement period is the current Ia. The current value measurer 23 thus outputs the product of the current Ia and the turns ratio of the CT of the current sensor CT1, as the value of current flowing in the conductor 20.

Figure 10:
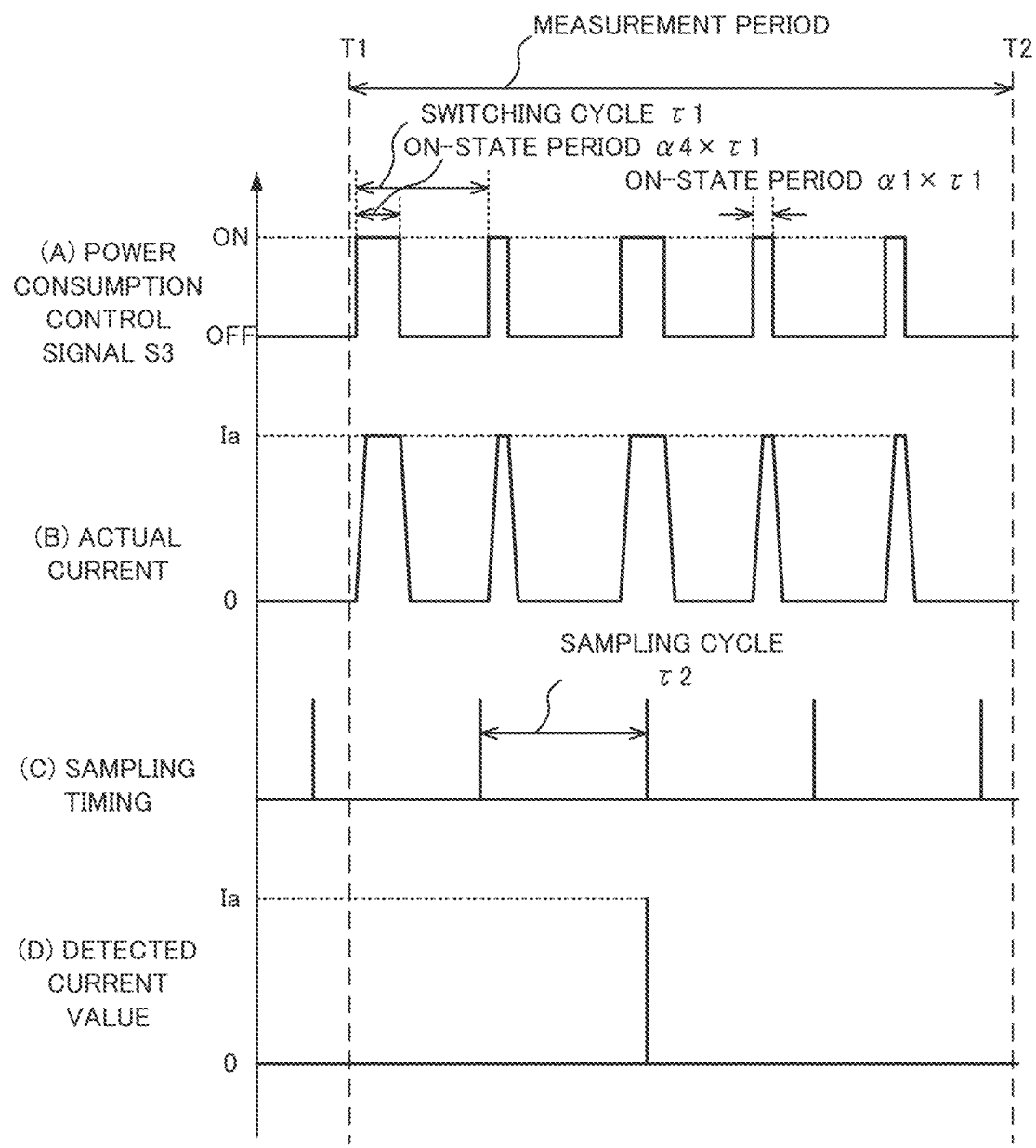
FIG. 10 is a timing chart illustrating a second modification of the operation of the control device according to the embodiment: the part (A) illustrates a power consumption control signal, the part (B) illustrates an actual current flowing in the conductor, the part (C) illustrates sampling timings, and the part (D) illustrates a detected current value.

In another exemplary modification, as illustrated in FIG. 10, the element controller 22 may control the switching element SW1 using the detective conduction ratio, in each of non-successive switching cycles. FIG. 10 can be understood like FIG. 5.

As illustrated in the part (A) of FIG. 10, the element controller 22 generates a power consumption control signal S3 for indicating the on-state during the period defined by a detective conduction ratio $\alpha 4$ higher than the target conduction ratio $\alpha 1$ and the length of the switching cycle in each of non-successive switching cycles, in specific, the first and the third switching cycles encompassed in the measurement period, and for indicating the on-state during the period defined by the target conduction ratio $\alpha 1$ and the length of the switching cycle in each of the other switching cycles. For example, assuming that $\tau 1$ indicates the length of a switching cycle, the on-state period indicated by the power consumption control signal S3 is a value of $\alpha 4 \times \tau 1$ calculated by multiplying the detective conduction ratio $\alpha 4$ by the switching cycle 11, in each of the first and the third switching cycles. The on-state period indicated by the power consumption control signal S3 is a value of $\alpha 1 \times \tau 1$ calculated by multiplying the target conduction ratio $\alpha 1$ by the switching cycle $\tau 1$, in each of the other switching cycles.

The switching element SW1, upon receiving a power consumption control signal S3 illustrated in the part (A) of FIG. 10 at the gate terminal, executes switching operations. These switching operations allow a current to flow in the conductor 20, as illustrated in the part (B) of FIG. 10. The part (B) of FIG. 10 illustrates an example of actual current flowing in the conductor 20. Ia indicates a value of current flowing in the conductor 20 while the switching element SW1 is in the on-state, for example.

As illustrated in the part (C) of FIG. 10, the sampling cycle 12 is determined on the basis of a clock independent from the switching cycles. One of the sampling timings of detection in the sampling cycles is included in the period during which the switching element SW1 is in the on-state, having a length of period of a value of $\alpha 4 \times \tau 1$ calculated by multiplying the detective conduction ratio $\alpha 4$ by the switching cycle 11, in the third switching cycle among the switching cycles.

The signal processing circuit 15 thus outputs a current Ia as the detected current value I1 that is a detected value of current flowing in the conductor 20, as illustrated in the part (D) of FIG. 10.

The current value measurer 23 measures a value of current flowing in the conductor 20, on the basis of the maximum value of the detected current values I1 within the measurement period. As illustrated in the part (D) of FIG. 10, the maximum value of the detected current values I1 is a current Ia. The current value measurer 23 thus outputs the product of the current Ia and the turns ratio of the CT of the current sensor CT1, as the value of current flowing in the conductor 20.

The element controller 22 may adjust the conduction ratio as described above, only when the target conduction ratio is equal to or lower than a threshold conduction ratio. In specific, the element controller 22 may generate a power consumption control signal S3 based on the target conduction ratio when the target conduction ratio is higher than the threshold conduction ratio, and may generate a power consumption control signal S3 based on the detective conduction ratio when the target conduction ratio is equal to or lower than the threshold conduction ratio. The threshold conduction ratio may be defined depending on a switching cycle and a sampling cycle.

In an exemplary case where the sampling cycle is longer than the switching cycle, the element controller 22 may use, as the threshold conduction ratio, the conduction ratio of the switching element SW1 when the on-state period of the switching element SW1 has the length equal to the half of the length of the sampling cycle. In this case, the element controller 22 may use, as the detective conduction ratio, a fixed value higher than the threshold conduction ratio.

In another exemplary case where the sampling cycle is equal to or shorter than the switching cycle, the element controller 22 may use, as the threshold conduction ratio, the conduction ratio of the switching element SW1 when the on-state period of the switching element SW1 has the length equal to the length of the sampling cycle. In this case, the element controller 22 may use, as the detective conduction ratio, the value equal to the threshold conduction ratio. In other words, the detective conduction ratio in this case is equal to the conduction ratio of the switching element SW1 when the on-state period of the switching element SW1 has the length equal to the sampling cycle.

The above-described hardware configuration and flowchart are mere examples and may be arbitrarily modified and corrected.

Figure 11:
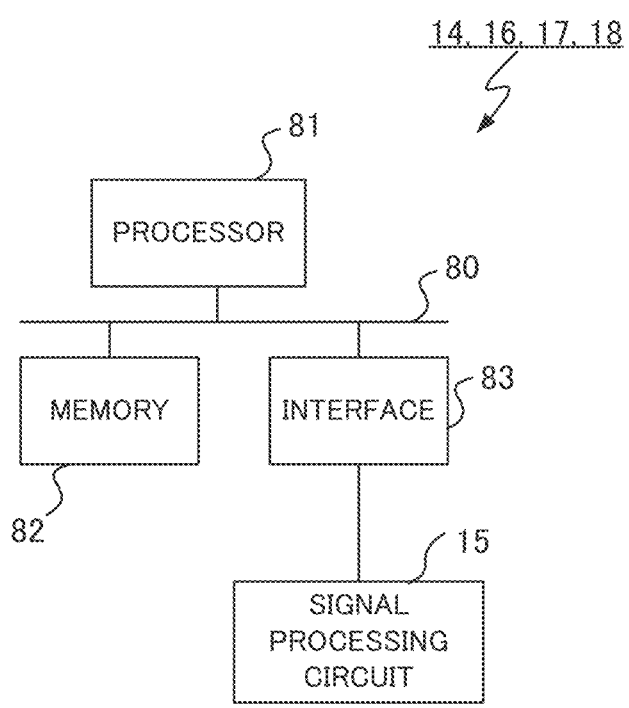
FIG. 11 is a block diagram illustrating a modification of the hardware configuration of the power conversion apparatus according to the embodiment.

The functions of the control devices 14, 16, 17, and 18 may be performed by software. The control devices 14, 16, 17, and 18 illustrated in FIG. 11 each include a processor 81, a memory 82, and an interface 83. The processor 81, the memory 82, and the interface 83 are connected to each other with buses 80.

The functions of the control devices 14, 16, 17, and 18 are performed by software, firmware, or a combination of software and firmware. The software and the firmware are described in the form of programs and stored in the memory 82. The processor 81 reads and executes the programs stored in the memory 82, and thus achieves the above-described functions of the components. That is, the memory 82 stores programs for executing operations of the control devices 14, 16, 17, and 18.

Examples of the memory 82 include non-volatile or volatile semiconductor memories, such as random access memory (RAM), read only memory (ROM), flash memory, erasable programmable read only memory (EPROM), and electrically erasable and programmable read only memory (EEPROM), magnetic disks, flexible disks, optical disks, compact discs, mini discs, and digital versatile discs (DVDs).

Some of the functions of the control devices 14, 16, 17, and 18 may be performed by dedicated hardware, while other functions may be performed by software or firmware. For example, the element controller 22 in the control device 14 may be achieved by the processing circuit 71 illustrated in FIG. 2, whereas the conduction ratio determiner 21 and the current value measurer 23 may be achieved by programs stored in the memory 82 when the programs are read and executed by the processor 81 illustrated in FIG. 11.

Although the control devices 14, 16, 17, and 18 measure a current value of the conductor in the above-described embodiment, this configuration is a mere example. The conductor may be replaced with any conductor that can switch between the conductive state and the non-conductive state in response to switching operations of a switching element.

The above-described power conversion circuit 11 is a mere example. The power conversion circuit may also be a direct-current-direct-current (DC-DC) converter or a three-level inverter, for example.

The capacitor C1 may also be a capacitor unit including multiple capacitors. In this case, the conduction ratio determiner 21 determines a target conduction ratio in accordance with a voltage between the terminals of the capacitor unit.

The above-described configuration of the power consumption circuit 13 is a mere example. The power consumption circuit 13 may include multiple resistors R1 and multiple switching elements SW1 each connected to the corresponding resistor R1. In this case, the individual switching elements SW1 of the power consumption circuit 13 are fed with the power consumption control signal S3 from the element controller 22. For example, when any of the estimated temperatures of the resistors R1 of the power consumption circuit 13 is higher than the threshold temperature, the element controller 22 may control the switching element SW1 connected to the resistor R1 having the estimated temperature higher than the threshold temperature so as to be in the off-state, and control the switching elements SW1 connected to the other resistors R1 so as to be in the on-state.

The electronic apparatus 1 is not necessarily a power conversion apparatus and may be any electronic apparatus including the capacitor C1 and the power consumption circuit 13.

The railway vehicle provided with the electronic apparatus 1 may use a dynamic braking force alone as the electric braking force, without a regenerative braking force.

The electronic apparatus 1 may also be installed in a railway vehicle of an AC feeding system as well as a railway vehicle of a DC feeding system. In this case, the electronic apparatus 1 converts DC power fed from the current collector via a transformer and a converter into three-phase AC power and feeds the three-phase AC power to the motor 91.

The electronic apparatus 1 may be installed in any moving body, such as automobile, marine vessel, or aircraft, other than the electric railway vehicles. The electronic apparatus 1 may also be placed in an indoor or outdoor space.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Electronic apparatus
1a, 1b Input terminal
11 Power conversion circuit
12 Power conversion circuit controller
13 Power consumption circuit
14, 16, 17, 18 Control device
15 Signal processing circuit
20 Conductor
21 Conduction ratio determiner 22 Element controller
23 Current value measurer
24 Temperature estimator
25 Power consumption estimator
71 Processing circuit
72 Interface circuit
80 Bus
81 Processor
82 Memory
83 Interface
91 Motor
C1 Capacitor
CT1 Current sensor
I1 Detected current value
R1 Resistor
S1 Operation command
S2 Power conversion control signal
S3 Power consumption control signal
SW1 Switching element
V1 Detected voltage value
VT1 Voltage sensor

The invention claimed is:

1. A control device to control a switching element connected to a conductor, the switching element executing a switching operation for causing the conductor to switch between a conductive state and a non-conductive state, the control device comprising:
  element controlling circuitry to control, when a target conduction ratio indicating a target value of a conduction ratio indicating a ratio of a length of a period during which the switching element is in an on-state to a length of a switching cycle is a positive value lower than 1, the switching element so as to be in the on-state during a period defined by a detective conduction ratio and the length of the switching cycle, in each of at least one cycle that is each the switching cycle, the detective conduction ratio being a value higher than the target conduction ratio and equal to or lower than 1; and
  current value measuring circuitry to measure, based on a detected current value, a value of direct current flowing in the conductor, the detected current value being digital data generated in every sampling cycle by detection of a current sensor signal, the sampling cycle being independent from the switching cycle, the current sensor signal being analog data output from a current sensor configured to measure a value of the direct current flowing in the conductor.

2. The control device according to claim 1, wherein the current value measuring circuitry measures the value of the direct current flowing in the conductor, based on a maximum value of at least one current value that is each the detected current value within a measurement period for measurement of the value of the direct current, the measurement period encompassing a plurality of the switching cycles.

3. The control device according to claim 1, wherein, in the at least one cycle that is each the switching cycle, the element controlling circuitry controls the switching element, based on a detective conduction ratio equal to a conduction ratio of the switching element when the period during which the switching element is in the on-state has a length equal to a length of the sampling cycle.

4. The control device according to claim 1, wherein
  the switching element is connected to a resistor via the conductor, and
  the switching element electrically connects the resistor to a capacitor or electrically disconnects the resistor from the capacitor.

5. The control device according to claim 2, wherein
  the element controlling circuitry
    controls the switching element so as to be in the on-state during the period defined by the detective conduction ratio and the length of the switching cycle, in a first switching cycle among the plurality of switching cycles encompassed in the measurement period, and
    controls the switching element so as to be in the on-state during a period defined by the target conduction ratio and the length of the switching cycle, in each switching cycle other than the first switching cycle among the plurality of switching cycles encompassed in the measurement period.

6. The control device according to claim 2, wherein
  the element controlling circuitry
    controls the switching element so as to be in the on-state during the period defined by the detective conduction ratio and the length of the switching cycle, in each of successive switching cycles among the plurality of switching cycles encompassed in the measurement period, and
    controls the switching element so as to be in the on-state during a period defined by the target conduction ratio and the length of the switching cycle, in each switching cycle other than the successive switching cycles among the plurality of switching cycles encompassed in the measurement period.

7. The control device according to claim 2, wherein
  the element controlling circuitry
    controls the switching element so as to be in the on-state during the period defined by the detective conduction ratio and the length of the switching cycle, in each of non-successive switching cycles among the plurality of switching cycles encompassed in the measurement period, and
    controls the switching element so as to be in the on-state during a period defined by the target conduction ratio and the length of the switching cycle, in each switching cycle other than the non-successive switching cycles among the plurality of switching cycles encompassed in the measurement period.

8. The control device according to claim 2, wherein, in the at least one cycle that is each the switching cycle, the element controlling circuitry controls the switching element, based on a detective conduction ratio equal to a conduction ratio of the switching element when the period during which the switching element is in the on-state has a length equal to a length of the sampling cycle.

9. The control device according to claim 2, wherein
  the switching element is connected to a resistor via the conductor, and
  the switching element electrically connects the resistor to a capacitor or electrically disconnects the resistor from the capacitor.

10. The control device according to claim 4, wherein the element controlling circuitry controls the switching element so as to be in the on-state during the period defined by the detective conduction ratio and the length of the switching cycle, in each of at least one cycle that is each the switching cycle and that is encompassed in a measurement period, the measurement period being started when a value of voltage applied to the capacitor exceeds a threshold voltage value.

11. The control device according to claim 4, wherein the element controlling circuitry controls the switching element, based on the detective conduction ratio, in each of at least one cycle that is each the switching cycle and that is encompassed in a measurement period, the measurement period being repeatedly started and ended in a predetermined cycle while voltage applied to the capacitor is higher than a threshold voltage.

12. The control device according to claim 4, further comprising:
   temperature estimating circuitry to estimate a temperature of the resistor, from a value of voltage applied to the capacitor, and the value of the direct current flowing in the conductor and measured by the current value measuring circuitry.

13. The control device according to claim 4, further comprising:
   power consumption estimating circuitry to estimate an amount of power consumption in the resistor during a measurement period, from the value of the direct current flowing in the conductor and measured by the current value measuring circuitry, a value of voltage applied to the capacitor, and a total length of at least one period during which the switching element is in the on-state within the measurement period.

14. An electronic apparatus comprising:
   a capacitor to be charged with DC power;
   a power consumption circuit connected in parallel to the capacitor and including
      a resistor, and
      a switching element connected in series to the resistor, the switching element being configured to electrically connect the resistor to the capacitor or electrically disconnect the resistor from the capacitor;
   a current sensor to measure a value of direct current flowing in a conductor that electrically connects the resistor to the switching element, and output a current sensor signal, the current sensor signal being analog data indicating the measured value of the direct current; and
   the control device according to claim 1, wherein
   the control device controls the switching element of the power consumption circuit.

15. The control device according to claim 9, wherein the element controlling circuitry controls the switching element so as to be in the on-state during the period defined by the detective conduction ratio and the length of the switching cycle, in each of at least one cycle that is each the switching cycle and that is encompassed in the measurement period that is started when a value of voltage applied to the capacitor exceeds a threshold voltage value.

16. The control device according to claim 9, wherein the element controlling circuitry controls the switching element, based on the detective conduction ratio, in each of at least one cycle that is each the switching cycle and that is encompassed in the measurement period that is repeatedly started and ended in a predetermined cycle while voltage applied to the capacitor is higher than a threshold voltage.

17. The control device according to claim 9, further comprising:
   temperature estimating circuitry to estimate a temperature of the resistor, from a value of voltage applied to the capacitor, and the value of the direct current flowing in the conductor and measured by the current value measuring circuitry.

18. The control device according to claim 9, further comprising:
   power consumption estimating circuitry to estimate an amount of power consumption in the resistor during the measurement period, from the value of the direct current flowing in the conductor and measured by the current value measuring circuitry, a value of voltage applied to the capacitor, and a total length of at least one period during which the switching element is in the on-state within the measurement period.

19. The electronic apparatus according to claim 14, wherein
   the electronic apparatus is designed for installation in a railway vehicle,
   the electronic apparatus further includes a power conversion circuit, the power conversion circuit being configured
      to convert DC power fed via the capacitor into electric power for being fed to a motor configured to generate a driving force of the railway vehicle and to feed to the motor the electric power resulting from the conversion, and
      to convert electric power fed from the motor operating as an electric generator into DC power and to charge the capacitor with the DC power resulting from the conversion, and
   when the target conduction ratio determined depending on a value of voltage applied to the capacitor is a positive value lower than 1 during deceleration of the railway vehicle, the element controlling circuitry controls the switching element so as to be in the on-state during the period defined by the detective conduction ratio and the length of the switching cycle, in each of the at least one cycle that is each the switching cycle.

20. A control method, comprising:
   controlling, when a target conduction ratio indicating a target value of a conduction ratio indicating a ratio of a length of a period during which a switching element is in an on-state to a length of a switching cycle is a positive value lower than 1, the switching element so as to be in the on-state during a period defined by a detective conduction ratio and the length of the switching cycle, in each of at least one cycle that is each the switching cycle, the switching element being connected to a conductor and being configured to execute a switching operation for causing the conductor to switch between a conductive state and a non-conductive state, the detective conduction ratio being a value higher than the target conduction ratio and equal to or lower than 1; and
   measuring, based on a detected current value, a value of direct current flowing in the conductor, the detected current value being digital data generated in every sampling cycle by detection of a current sensor signal, the sampling cycle being independent from the switching cycle, the current sensor signal being analog data indicating a value of the direct current flowing in the conductor.

* * * * *